(12) United States Patent
Kozlowski (10) Patent No.: US 6,965,707 B1
(45) Date of Patent: Nov. 15, 2005

(54) COMPACT ACTIVE PIXEL WITH LOW-NOISE SNAPSHOT IMAGE FORMATION

(75) Inventor: Lester J. Kozlowski, Simi Valley, CA (US)

(73) Assignee: Rockwell Science Center, LLC, Thousand Oaks, CA (US)

( * ) Notice: Subject to any disclaimer, the term of this patent is extended or adjusted under 35 U.S.C. 154(b) by 620 days.

(21) Appl. No.: 09/675,488

(22) Filed: Sep. 29, 2000

(51) Int. Cl.$^7$ .............................................. G06K 7/00
(52) U.S. Cl. ...................... 382/312; 257/291; 257/292; 250/208.1
(58) Field of Search ................ 382/312; 257/291–292; 250/208.1

(56) References Cited

U.S. PATENT DOCUMENTS

| | | | |
|---|---|---|---|
| 4,249,122 A | 2/1981 | Widlar | 323/313 |
| 4,463,383 A | 7/1984 | Sonoda et al. | 358/212 |
| 4,466,018 A | 8/1984 | Sonoda et al. | 358/213 |
| 4,676,761 A | 6/1987 | Poujois | 445/3 |
| 4,794,247 A | 12/1988 | Stineman et al. | 250/214 A |
| 5,043,820 A | 8/1991 | Wyles et al. | 358/213.8 |
| 5,055,667 A | 10/1991 | Sayag | 250/208.1 |
| 5,083,016 A | 1/1992 | Wyles et al. | 250/208.1 |
| 5,128,534 A | 7/1992 | Wyles et al. | 250/208.1 |
| 5,146,302 A | 9/1992 | Kumada | 357/24 |
| 5,296,696 A | 3/1994 | Uno | 250/208.1 |
| 5,345,266 A | 9/1994 | Denyer et al. | 348/300 |
| RE34,802 E | 11/1994 | Sayag et al. | 250/208.1 |
| 5,382,977 A | 1/1995 | Kozlowski et al. | 348/300 |
| RE34,908 E | 4/1995 | Wyles et al. | 250/208.1 |
| 5,461,425 A | 10/1995 | Fowler et al. | 348/294 |
| 5,471,515 A | 11/1995 | Fossum et al. | 377/60 |
| 5,541,402 A | 7/1996 | Ackland et al. | 250/208.1 |
| 5,576,763 A | 11/1996 | Ackland et al. | 348/308 |
| 5,587,596 A | 12/1996 | Chi et al. | 257/233 |
| 5,608,243 A | 3/1997 | Chi et al. | 257/249 |
| 5,627,112 A | 5/1997 | Tennant et al. | 438/113 |
| 5,665,959 A | 9/1997 | Fossum et al. | 250/208.1 |
| 5,841,126 A * | 11/1998 | Fossum et al. | 250/208.1 |
| 5,892,540 A | 4/1999 | Kozlowski et al. | 348/300 |
| 5,898,168 A | 4/1999 | Gowda et al. | 250/208.1 |
| 5,929,434 A | 7/1999 | Kozlowski et al. | 250/214 A |
| 5,933,190 A | 8/1999 | Dierickx et al. | 348/302 |
| 6,001,668 A | 12/1999 | Anagnostopoulos et al. | 438/70 |
| 6,005,619 A * | 12/1999 | Fossum | 348/315 |
| 6,043,525 A | 3/2000 | Chen | 257/292 |
| 6,064,431 A | 5/2000 | Ueno | 348/241 |
| 6,166,768 A * | 12/2000 | Fossum et al. | 348/308 |
| 6,410,899 B1 * | 6/2002 | Merrill et al. | 250/208.1 |
| 6,445,022 B1 * | 9/2002 | Barna et al. | 257/292 |
| 6,493,030 B1 * | 12/2002 | Kozlowski et al. | 348/310 |

(Continued)

OTHER PUBLICATIONS

R.H. Dyck and G.P. Weckler, "Integrated Arrays Of Silicon Photodetectors For Image Sensing", IEEE Trans. Electron Devices, ED-15, Apr. 1968, pp. 196-201.

(Continued)

*Primary Examiner*—Andrew W. Johns
*Assistant Examiner*—Patrick L. Edwards
(74) *Attorney, Agent, or Firm*—Doyle B. Johnson; Reed Smith LLP (57) ABSTRACT

A low-noise active pixel circuit is disclosed that efficiently suppresses reset (kTC) noise by using a compact preamplifier consisting of a photodetector and only four MOSFETs of identical polarity, in conjunction with ancillary circuits located on an imager's periphery. The supporting circuits help the simplified pixel circuit to synchronously acquire (i.e., take a snapshot) an image across an imaging array, read the signal with low noise, and efficiently reset the pixel with low noise.

12 Claims, 7 Drawing Sheets

U.S. PATENT DOCUMENTS

2003/0103153 A1 * 6/2003 Fossum ................. 348/308

OTHER PUBLICATIONS

J.D. Plummer and J.D. Meindl, "MOS Electronics For A portable Reading Aid For The Blind", IEEE J. Solid-State Circuits, SC-7, Apr. 1972, pp. 111-119.

N. Koikke, I. Takemoto,K, Satoh, S. Hanamura, S. Nagahara and M. Kubo, "MOS Area Sensor: Part I—Design Consideration And Performance Of An n-p-n Structure 484 ×384 Element Color MOS Imager", IEEE Trans Electron Devices, ED-27 (8), Aug. 1980, pp. 1676-1681.

S. Ohba, M. Nakai, H. Ando, S. Hanamura, S. Shimada, K. Satoh, K. Takahashi, M. Kubo and T. Fujita, "MOS Area Sensor: Part II—Low-Noise MOS Area Sensor With Antiblooming Photodiodes", IEEE Trans. Electron Devices, ED-27 (8) Aug. 1980, pp. 1682-1687.

EG&G Reticon Sales Catalog, *Image Sensing and Solid State Camera Products 1994/1995*. Solid State Image Sensor Array Specification For Part No.: RA0256B.

EG&G Reticon Sales Catalog, *Image Sensing and Solid State Camera Products 1994/1995*. *High Speed* Solid State Image Sensor Array Specification For Part No.: RA2568N.

EG&G Reticon Sales Catalog, *Image Sensing and Solid State Camera Products 1994/1995*. Solid State Sensor Arrays Specification For Part Nos.: RA0100A/RA0128N.

H. Ando, S. Ohba, M. Nakai, T. Ozaki, M. Ozawa, K. Ikeda, T. Masuhara, T. Imaide, I, Takemoto, T. Suzuki and T. Fukita, Design Consideration And Performance Of A New MOS Imaging Device, IEEE Trans. On Elec. Dev., ED-32 (8), Aug. 1985, pp. 1484-1489.

N. Tanaka, T. Ohmi and Y. Nakamura, "A Novel Bipolar Imaging Device With Self-Noise Reduction Capability", IEEE Trans. Elec. Dev., 36 (1), Jan. 1989, pp. 31-38.

G.P. Weckler, "Storage Mode Operation Of A Phototransistor And Its Adaptation To Integrated Arrays Foe Image Detection", IEDM, Oct. 1996. (Abstract Only—No Known paper available from professional document delivery services).

N. Tanaka, T. Ohmi, Y. Nakamura and S. Matsumoto, "A Low-Noise Bi-CMOS Linear Imager Sensor With Auto-Focusing Function", IEEE Trans. Elec. Dev., 36 (1), Jan. 1989, pp. 39-45.

N. Tanaka, S. Hashimoto, M. Shinohara, S. Sugawa, m. Morishita, S. Matsumora, Y. Nakamura and T. Ohmi, A 310k Pixel Bipolar Imager (BASIS), ISSCC 1989.

G.P. Weckler, "Charge Storage Lights The Way For Solid-State Image Sensors", Electronics, May 1, 1967, pp. 75-78.

G.P. Weckler, "Operation of p-n Junction Photodetectors In A Photon Flux Integrating Mode", IEEE Journal Of solid State Circuits, vol. SC-2, No. 3, Sep. 1967, pp. 65-73.

G.P. Weckler and R.H. Dyck, "Integrated Arrays Of Silicon Photodetectors For Image Sensing", WESCON, Aug. 22-25, 1967, pp. 1-8.

L.J. Kozlowski, J. Luo, W.E. Kleinhans and T. Lui, "Comparison Of Passive And Active Pixel Schemes For CMOS Visible Imagers", SPIE, vol. 3360, Apr. 1998.

Ming-Jer Chin, Yen-Bin Gu, Terry Wu, Po-Chin Hsu and Tsung-Hann Liu, "Weak Inversion Charge Injection In Analog MOS Switches", IEEE Journal Of Solid-State Circuits, vol. 30, No. 5, May 1995, pp. 604-606.

Peter W. Fry, Peter J. W. Noble and Robert J. Rycroft, "Fixed-Pattern Noise In Photomatrices", IEEE Journal Of Solid-State Circuits, vol. SC-5, No. 5, Oct. 1970, pp. 250-254.

Degrauwe, et al., "A Micropower CMOS-Instrumentation Amplifier", IEEE Journal Of Solid-State Circuits, vol. SC-20, No. 3 Jun. 1985, pp. 805-807.

Letter Dated Jul. 31, 1998, From Gene Weckler, RAD-ICON Imaging Corp., addressed to Mark Wettler.

L.J. Kozlowski, D. Standley, J. Luo. A Tomasini, A. Gallagher, R. Mann, B.C. Hsieh, T. Liu and W.E. Kleinhans, "Theoretical Basis And Experimental Confirmation: Why A CMOS Imager Is Superior To A CD", SPIE Conference On Infrared Technology And Applications XXV, Orlando, Fla, Apr. 1999, vol. 369, pp. 388-396.

Mendis, et al., "A 128 ×128 CMOS Active Pixel Image Sensor For Highly Integrated Imaging Systems," IEEE Electron Device Meeting, p. 583, 1993.

Copy of PCT Search Report.

Savvas G. Chamberlain and Jim P.Y. Lee, A Novel Wide Dynamic Range Silicon Photodetector And Linear Imaging Array, IEEE 1984, pp. 175-182.

* cited by examiner

FIGURE 3 (RESET)

FIGURE 4 (INTEGRATE)

FIGURE 5 (SNAPSHOT)

FIGURE 6 (READ)

COMPACT ACTIVE PIXEL WITH LOW-NOISE SNAPSHOT IMAGE FORMATION

BACKGROUND OF THE INVENTION

1. Field of the Invention

The present invention relates generally to electronic imaging devices and, more particularly, to low noise CMOS image sensors having "snapshot" image formation capability.

2. Description of the Related Art

Significant advances in photosensor image processing for camera and video systems are now possible through the emergence of CMOS pixel sensors. CMOS-based imaging sensors have distinct manufacturing cost savings and low power use advantages over other technologies such as charge coupled devices (CCD). A CMOS image sensor's performance, however, is often limited by the noise generated by resetting each of its photodiodes to a known potential after each electronic image, or picture, is read out. Such noise is readily suppressed in CCD-based cameras because CCD reset noise is generated on only one capacitance, i.e., the sense diffusion diode that converts the photo-generated charge to a voltage. Also, full-frame memory is not needed to post-process the video to remove the reset noise because each pixel's reset and signal levels are successively read and the reset noise is conveniently removed by using only one memory element.

Similarly, the reset noise (kTC) in a CMOS sensor causes uncertainty about the voltage on each photo-detector following the reset, but each pixel's reset signal is not normally available. Because the reset noise of CMOS imagers is often the dominant source of temporal noise and is critical to overall imager performance, there is a need for a pixel-based preamplifier that suppresses reset noise without requiring separate readout of all the reset and signal levels, in order to subsequently subtract the correlated reset noise using full-frame memory. In addition, the preamplifier must be as compact as possible to maximize the fraction of pixel area that is used for collecting the light. Simultaneously maximizing the light-gathering area and minimizing the reset noise maximizes sensor performance so that it can operate even at low levels of light.

Mendis et al., discloses a single-stage, charge coupled device (CCD) type of image sensor in an article entitled, "A 128×128 CMOS Active Pixel Image Sensor for Highly Integrated Imaging Systems", IEEE Electron Devices Meeting, p. 583, 1993. The overall imager is customarily considered a CMOS imager due to the co-integration of ancillary CMOS electronics that support the pixel preamplifier—even though the scheme requires process enhancements that significantly depart from conventional CMOS technologies. For example, the photogate must be optically transparent in the visible part of the electromagnetic spectrum. A transparent gate electrode must preferably be used to provide reasonable sensitivity in the blue part of the visible spectrum as is commonly done in CCDs, e.g. a thin indium tin oxide (ITO) gate electrode (e.g. U.S. Pat. No. 6,001,668). No CMOS foundry processes support integration of ITO electrodes due to possible wafer contamination and concomitant yield loss. Nevertheless, Mendis' charge-based preamplifier ideally provides a storage site at each pixel that readily facilitates both snapshot image formation and in-pixel correlated double sampling. Another key issue related to incompatibility with standard CMOS technology is the difficulty in optically isolating this storage site to eliminate image smear.

U.S. Pat. No. 5,898,168 teaches a compact CMOS pixel-based preamplifier that uses only three MOSFETs by providing a row-based circuit and method for successively reading the reset and signal levels. The system requires that the column buffer supporting each column of pixels preferably dwells on each specific row (c.f., FIGS. 5 and 6 of U.S. Pat. No. 5,898,168) in order to optimally perform the correlated double sampling required for suppressing reset noise. Alternatively, a full page of memory must be allocated either on-chip or in the external camera electronics to subtract each pixel's reset value from its final signal value on a frame-by-frame basis. Further, the image formation process should preferably be performed on a row-by-row basis in order to minimize inaccuracy in measuring the reset and signal levels for each pixel because the source followers in each column of pixels are all connected together.

SUMMARY OF THE INVENTION

In general, the present invention comprises a low-noise imaging system for implementation in CMOS or in other semiconductor fabrication technologies. The low-noise amplifier system efficiently suppresses reset (kTC) noise by using a compact preamplifier consisting of a photodetector and only four MOSFETs of identical polarity in conjunction with ancillary circuits located on the CMOS imager's periphery. The supporting circuits help the simplified pixel circuit to synchronously acquire (i.e., take a snapshot) an image across an imaging array, read the signal with low noise, and efficiently reset the pixel with low noise.

The low noise amplifier system of the present invention is formed by the aggregate circuitry in each pixel, the supporting circuitry in the column buffer amplifier and the row-based circuitry, and the waveform generation circuits servicing each column and row of pixels. The signals from the active pixels are read out by the low-noise signal amplification system consisting of the pixel comprised of only four MOSFETs, the waveform generators and a standard column buffer. In addition to circuitry for suppressing the detector's reset noise, the column buffer in the downstream electronics typically performs additional signal processing, sample-and-hold, optional video pipelining, and column amplifier offset cancellation functions to suppress the temporal and spatial noise that would otherwise be generated by the column buffer.

The low-noise system of the present invention provides the following key functions: (1) provides true "snapshot" image formation; (2) suppresses reset noise without having to provide analog memory to facilitate correlated double sampling; (3) provides high sensitivity via source follower amplification with small sense capacitance; (4) minimizes demand on amplifier bandwidth to avoid generation of fixed pattern noise due to variations in amplifier time constant and stray capacitance; (5) provides adequate power supply rejection to enable development of imaging systems-on-a-chip that do not require elaborate support electronics; and (6) is compatible with application to imaging arrays having pixel pitch well below 10 microns.

The present invention has the advantage of full process compatibility with standard silicided submicron CMOS. The present invention also helps to maximize yield and minimize die cost because the circuit complexity is distributed among the active-pixels and peripheral circuits. The spectral response is broad from the near-ultraviolet (400 nm) to the near-IR (>800 nm).

Because the present invention has only four MOSFETs in each pixel, the invention provides as-drawn optical fill factor >40% at 5 μm pixel pitch using 0.25 μm design rules in CMOS. The actual optical fill factor is somewhat larger due to lateral collection and the large diffusion length of commercial CMOS processes. Another advantage is the flexibility to collocate digital logic and signal-processing circuits due its high immunity to electromagnetic interference.

When fully implemented in the desired camera-on-a-chip architecture, the low-noise active pixel sensor (APS) can provide temporal read noise below 10 e- (at data rates compatible with either video imaging or still photography via electronic means), fixed pattern noise significantly below 0.02% of the maximum signal (on a par with competing CCD imagers), <0.5% nonlinearity, ≧1 V signal swing for 3.3 V power supply, large charge-handling capacity, and variable sensitivity using simple serial interface updated on a frame-by-frame basis via digital interface to a host microprocessor.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF TE INVENTION

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a low noise CMOS image sensor circuit having "snapshot" image formation capability. Any and all such modifications, equivalents and alternatives are intended to fall within the spirit and scope of the present invention.

The CMOS readout and amplification system of the present invention includes an exemplary design for an active-pixel CMOS imager. A prototype embodiment of the low-noise APS invention can be configured, for example, as a visible imager comprising an array of 1024 (columns) by 728 (rows) of visible light detectors (photodetectors). The rows and columns of active-pixels can be spaced 5 microns center-to-center using 0.25 μm design rules to provide as-drawn optical fill factor >40%. Several columns and rows of detectors at the perimeter of the light-sensitive region can be covered with metal and used to establish the dark level for off-chip signal processing. In addition, the detectors in each row can be covered with color filters to produce color imagers. For example, the odd rows may begin at the left with red, green, then blue filters, and the even rows may begin with blue, red, then green filters, with these patterns repeating to fill the respective rows. A standard Bayer filter pattern can also be applied.

Figure 1:
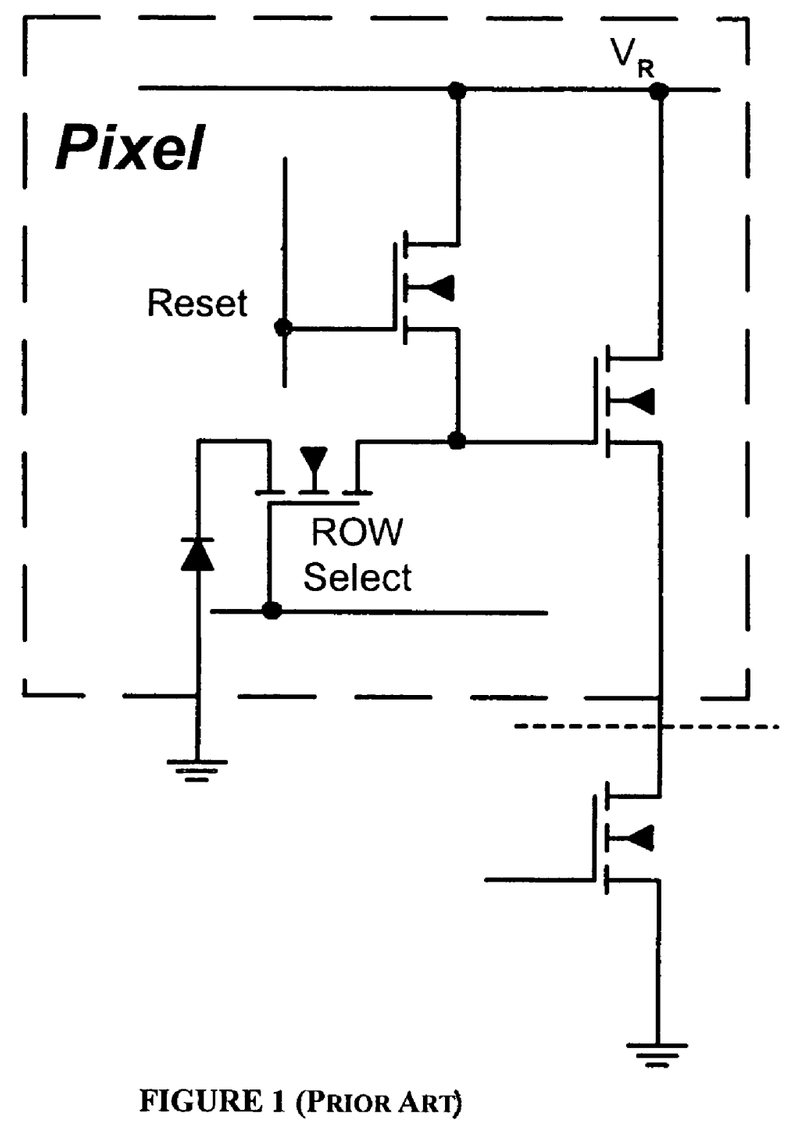
FIG. 1 is a schematic circuit diagram illustrating a compact amplifier system in a CMOS imaging array of the prior art as taught by U.S. Pat. No. 5,898,168.
Figure 2:
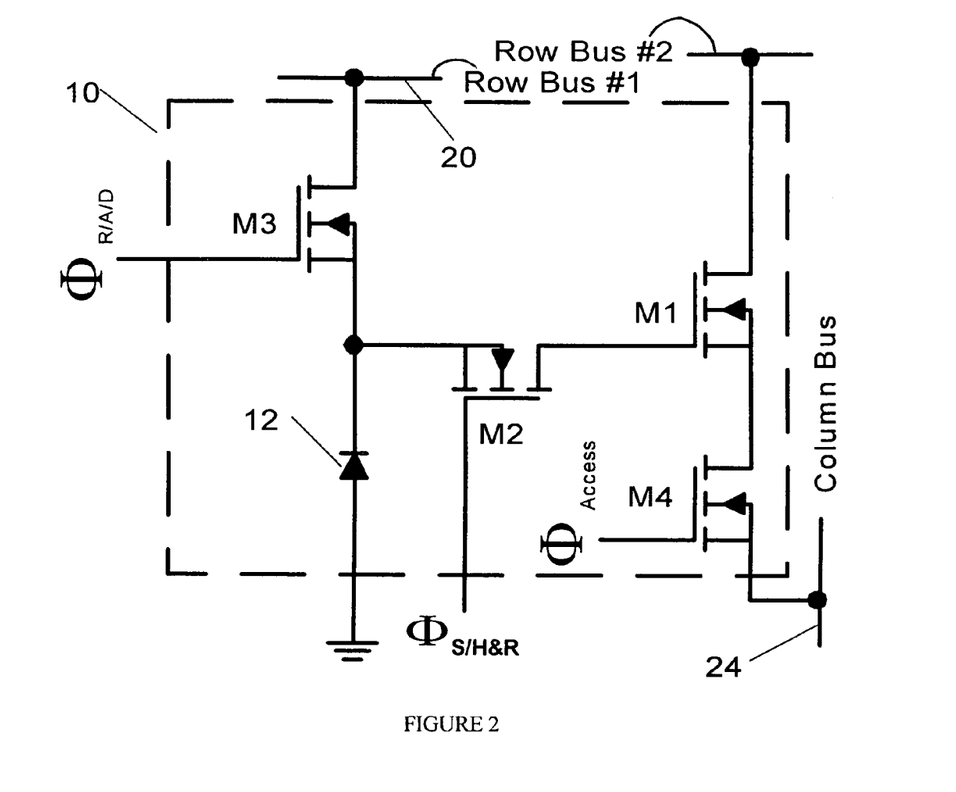
FIG. 2 is a schematic circuit diagram illustrating the compact amplifier system for a CMOS imaging array of the present invention.

A low-noise pixel design 10 of the present invention is illustrated in the schematic diagram of FIG. 2. In the preferred embodiment, each pixel 10 of the sensor array comprises a photodetector along with 4 MOSFETs of identical polarity to allow efficient use of the available pixel real estate. MOSFET M1 serves dual roles as the driver of a source follower amplifier for the specific time when the signal is being read on a row-by-row basis, and as the driver of a reset amplifier when the photodetector is being reset. Reset is also performed on a row-by-row basis before the actual snapshot is taken. Since only about 30 μs is required (as later explained) to reset each row via feedback amplification, only several tens of milliseconds are needed for imager "setup" prior to the actual electronic capture of the image. For example, the exemplary 1024 by 728 imager requires about 20 msec to reset the CMOS imager. Furthermore, by using circuitry outside of the pixel to effect the reset amplification during signal reset, the invention suppresses reset noise without having to implement correlated double sampling using either on-chip or off-chip memory. MOSFET M2 transfers the signal from each detector to the gate of M1 to take the electronic "snapshot" of an image.

MOSFET M3 is used in several operating modes. During reset, MOSFET M3 discharges any charge left on the photodetector along with the "snapshot" photo-charge on the gate of MOSFET M1 to facilitate full reset of the pixel via feedback-enhanced amplification. During signal integration and snapshot image capture, MOSFET M3 is disabled to allow photogenerated carriers to discharge the photodiode from the previously established reset level. After snapshot image capture, MOSFET M3 is enabled in order to drain any unwanted photo-charge that is generated after the integration epoch. MOSFET M2 is briefly enabled during snapshot image capture to sample the photogenerated signal onto the gate of MOSFET M1. MOSFET M4 is used alternately to: isolate each row of pixels during reset and readout; to provide a cascode FET for the transimpedance amplifier during reset; to disable the source follower during snapshot integration; and to connect the source follower amplifier MOSFET M1 to a current source in the peripheral circuitry during signal readout. In the typical two-dimensional array for incorporating this invention, the multiplexing is performed, as in the prior art, by horizontal and vertical shift registers.

As used herein, MOSFET M1 is referred to as the driver transistor, MOSFET M2 as the snapshot transistor, MOSFET M3 as the reset transistor, and MOSFET M4 as the isolation transistor (since it acts to isolate the pixel from the column buffer).

Photodiode 12 may comprise a substrate diode, for example, with the silicide cleared. In this embodiment, it is necessary to clear the silicide because it is opaque to visible light. Pixel 10 is designed to obtain the largest available light detecting area while providing broad spectral response, control of blooming and signal integration time, and compatibility with CMOS production processes.

For maximum compatibility with standard submicron CMOS processes, photodiode 12 may be formed at the same time as the lightly doped drain (LDD) implant of n-type MOSFETs for the chosen process; this creates an n-on-p photodiode junction in the p-type substrate that is common to most CMOS processes. Since no additional ion implantation is necessary, the process and wafer cost for active-pixel circuit 10 are the same as those of standard, high volume digital electronic products.

Figure 3:
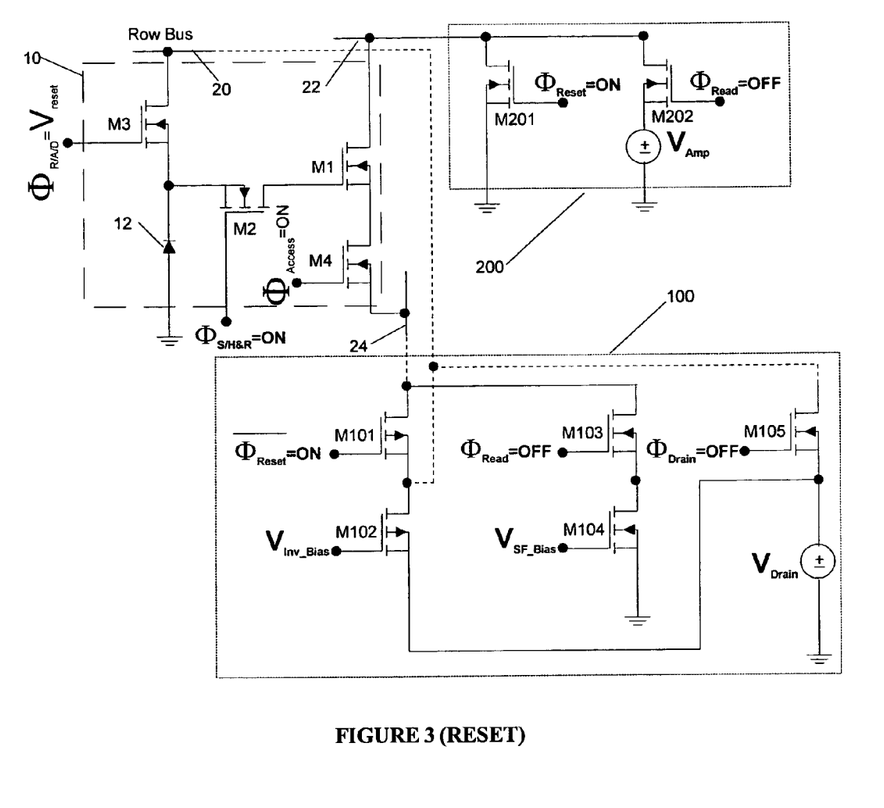
FIG. 3 is a schematic circuit diagram illustrating the compact amplifier system for the CMOS imaging array of the present invention during row-based reset of the entire imaging array.

In the preferred embodiment, the photodetectors 12 are reset at the start of image capture as shown by the circuit configuration implemented in FIG. 3. Bus 24 connects all the pixels in the photodetector array to a column buffer 100 including switch MOSFET M101 and load MOSFET M102. The load MOSFET M102 is set at the appropriate voltage to bias the composite inverter amplifiers formed by amplifier MOSFET M1, cascode MOSFET M4, and the complementary MOSFET M101 in the supporting column buffer. The other leg of the reset amplifier is connected to ground through switch MOSFET M201, which is located in row driver 200. The feedback path for resetting the photodiode is completed by connecting the gate of MOSFET M3 to the drain of M102 via the row bus 20. The inverter amplifier is thus configured as a reset integrator with capacitive-feedback provided by M1's Miller capacitance.

MOSFET M103 is alternately enabled when the signal pixel is being read in each row on a column by column basis. MOSFWT M103 is thus simply a switch to allow M104 to function as a current source for the source follower formed by drive transistor M1, cascode transistor M4, switch transistor M103 and current source M104. MOSFWT M105 is asserted during the reset interval to discharge the photogenerated signal in the entire imaging sensor to the voltage set by $V_{Drain}$. $V_{Drain}$ is also the supply voltage for the inverting reset amplifier formed by transistors M1, M4. M101 and M102 to reset the snapshot image formed at the gate of M1 via the negative feedback associated with tapered reset. So, the path leg through M101 is used for tapered reset of the snapshot image, path leg through M103 is used for readout of the snapshot image stored at the gate of M1, and path leg through M105 is used for photodiode reset.

Figure 8:
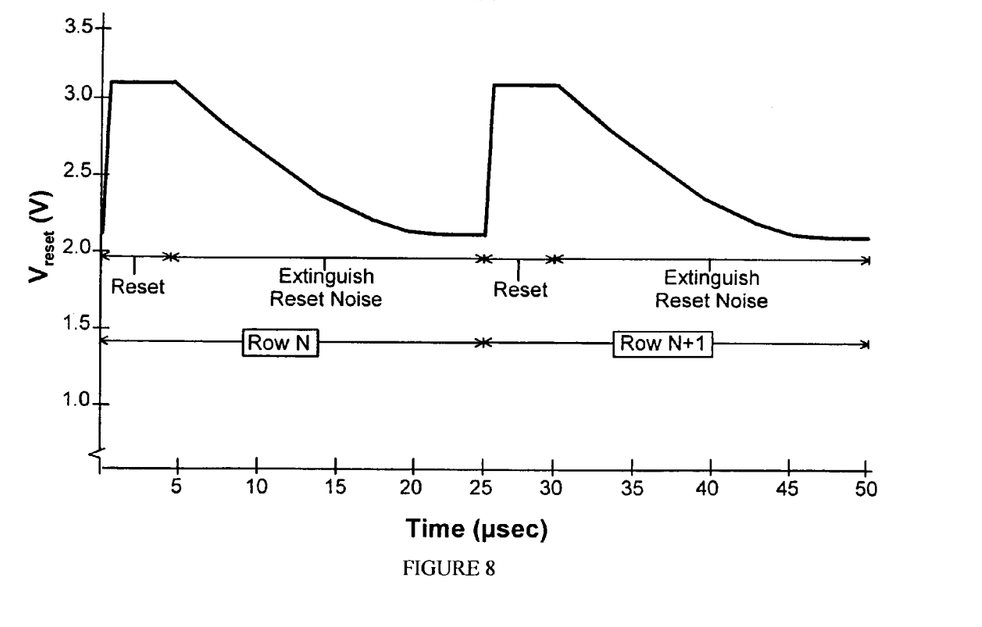
FIG. 8 is a diagram illustrating the reset waveform for the $V_{reset}$ clock during row-based reset of the imaging array.

Low-noise reset is subsequently accomplished by applying a tapered reset waveform (as shown in FIG. 8) to the gate of MOSFET M3 by supplying the appropriate $\Phi_{R/A/D}$ waveform. The $\Phi_{R/A/D}$ waveform is specifically generated in the row driver circuit that supports each row of the CMOS imager. For the time each row is being reset, the $\Phi_{R/A/D}$ waveform is identical to the $V_{reset}$ waveform shown in FIG. 8. MOSFET M1 thus acts as a transconductance, and reset MOSFET M3 acts as a resistance controlled by the $\Phi_{R/A/D}$ waveform. The series resistance of MOSFET M3 is gradually increased by applying slowly a decreasing ramp waveform (FIG. 4) to the gate to give the feedback transconductance of MOSFET M1 the opportunity to null the reset noise via feedback. This active-pixel implementation resets within an aperture of tens of microseconds using standard CMOS technology.

Figure 4:
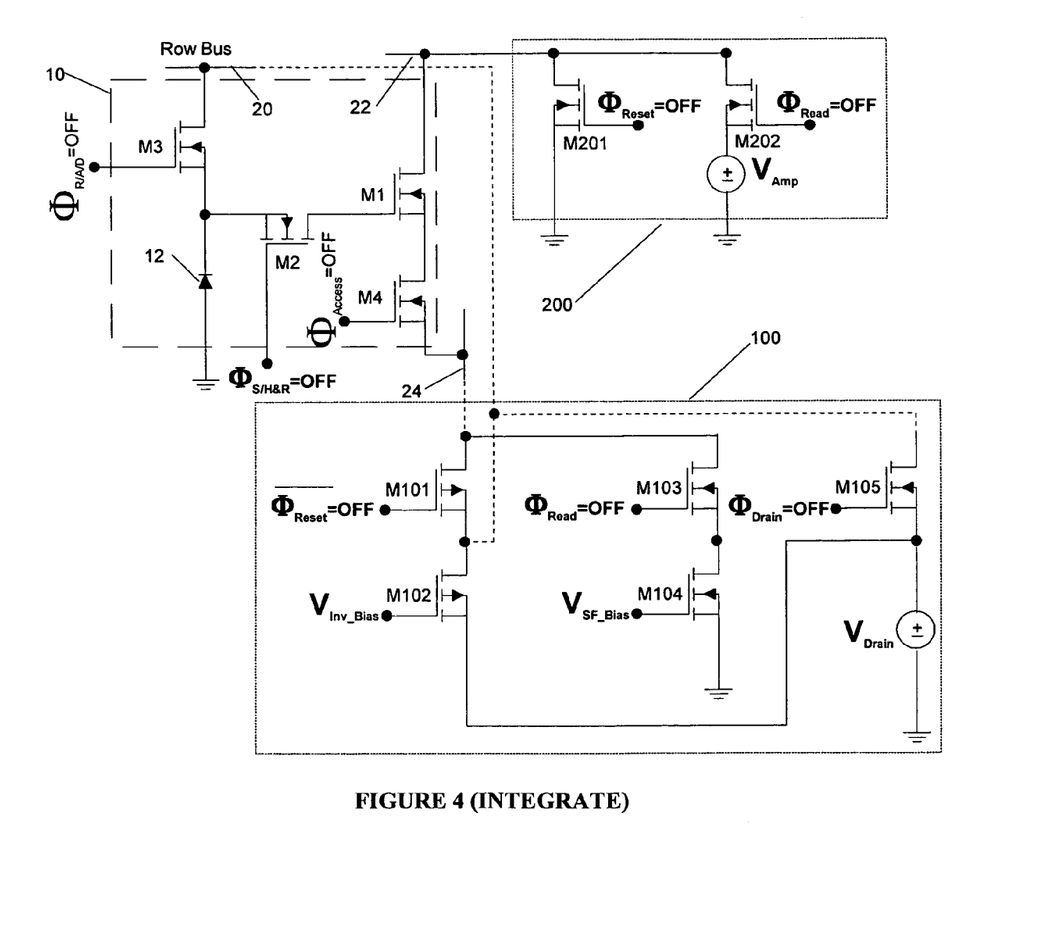
FIG. 4 is a schematic circuit diagram illustrating the compact amplifier system for the CMOS imaging array of the present invention during global integration of the photo-generated signal.

The present invention is shown configured in signal integration mode in FIG. 4. MOSFETs M3 and M4 are now disabled to allow charge to integrate on the photodiode capacitance. For the illustrated embodiment, the photo-generated electrons discharge the photovoltage toward ground. All supporting row driver and column buffer circuits are turned off to isolate the array of pixels for unperturbed signal integration. The pixel is configured in this manner for the specified integration time to provide an electronic shutter.

Figure 5:
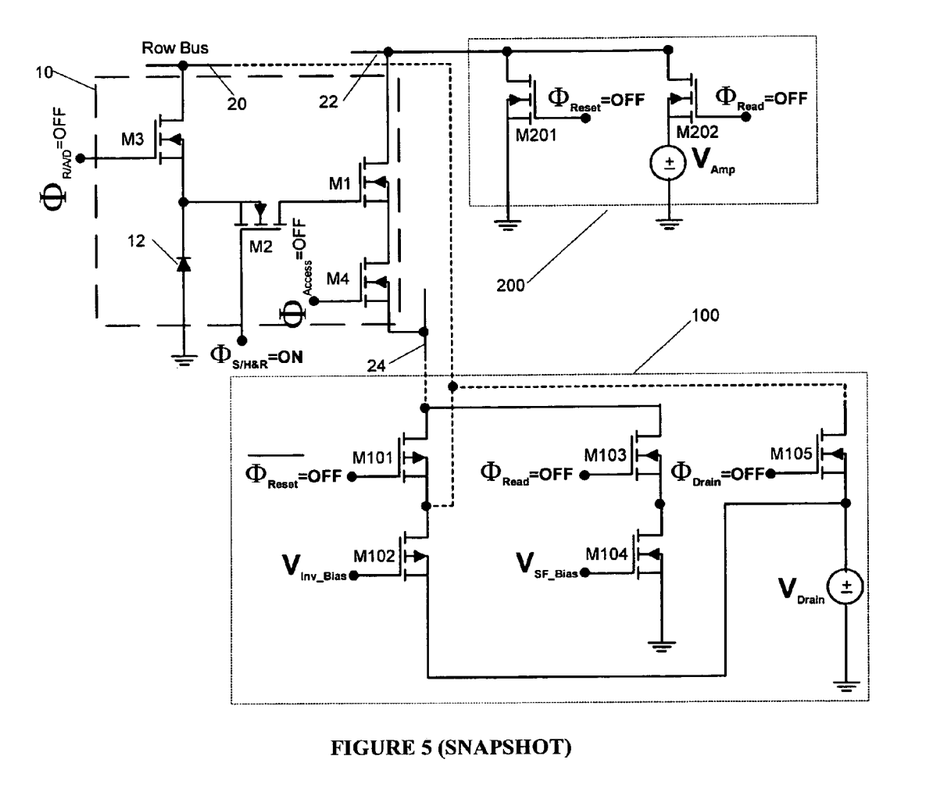
FIG. 5 is a schematic circuit diagram illustrating the compact amplifier system for the CMOS imaging array of the present invention during global snapshot image formation of the imaging array.

FIG. 5 also shows the same circuitry as before, but now with the circuit configured in snapshot mode. The only change is that the $\Phi_{S/H\&R}$ signal is briefly enabled to transfer the charge from the photodiode capacitance to the gate capacitance of MOSFET M1.

Figure 6:
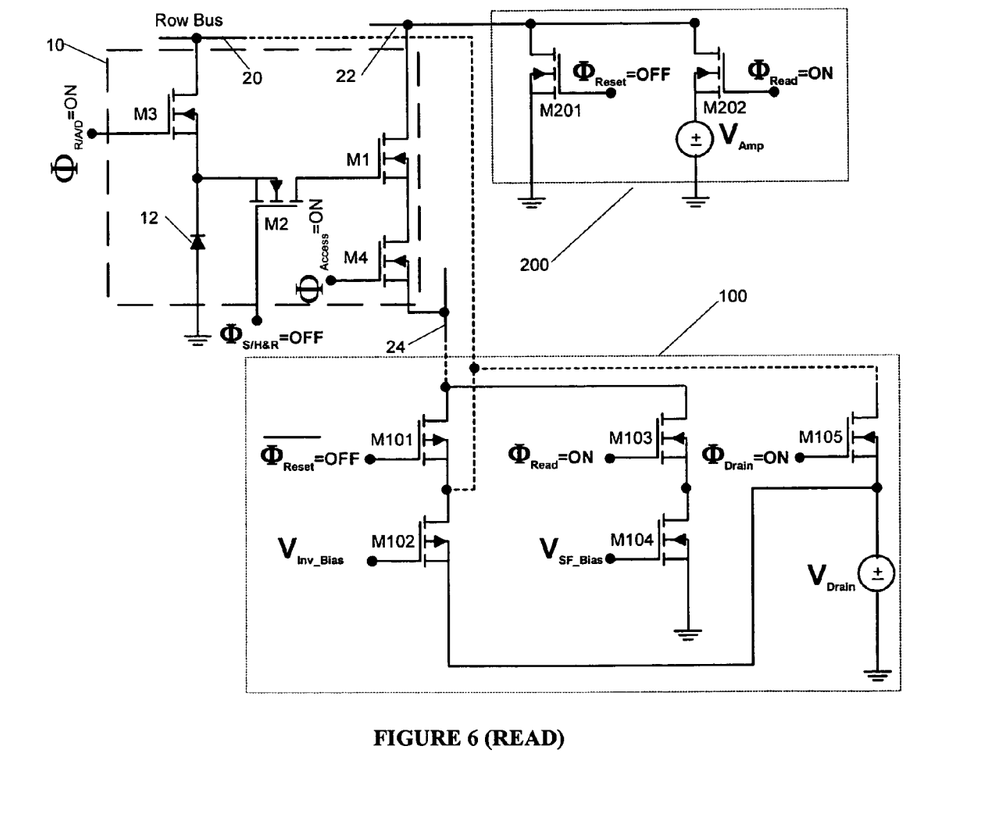
FIG. 6 is a schematic circuit diagram illustrating the compact amplifier system for the CMOS imaging array of the present invention during row-based readout of the imaging array.

FIG. 6 shows the same circuitry as before, but with the configuration changed for signal readout. Within each row, pixels 10 are read out from left to right or right to left. Readout is initiated by enabling MOSFET M202 so that the upper leg of M1 is connected via row bus 22 to low-impedance voltage source $V_{amp}$. The lower leg of M4 is connected to a current source M104 in the column buffer via column bus 24. MOSFET M1 is now a source follower driver so that the sampled signal from the gate of each MOSFET M1 is efficiently transferred to column bus 20. In addition, the low impedance voltage source $V_{drain}$ is connected via row bus 20 to the gate of MOSFET M3 to continuously discharge any unwanted photo-signal from photodiode 12.

The application of the tapered reset waveform to the composite reset amplifier enables the kTC noise envelope to decay before the reset switch M3 is completely opened. Using tapered reset, the row is resettable to tens of microseconds for full noise suppression, or shorter time for moderate noise reduction. U.S. patent application Ser. No. 09/057,423, entitled "COMPACT LOW-NOISE ACTIVE PIXEL SENSOR WITH PROGRESSIVE ROW RESET" filed on Apr. 8, 1998, the disclosure of which is herein incorporated by reference, describes the generalized small-signal equivalent circuit model during reset. This circuit allows calculation of the steady-state noise envelope at the reset node depending on reset switch resistance, $R_{sw}$. If the reset voltage is ramped down too slowly, too much time is needed to reset each row and operation at video frame rates can become problematic. If the tapered-reset waveform is instead ramped down too quickly, then the kTC noise envelope will not decay sufficiently to suppress reset noise before the switch is completely opened.

Figure 7:
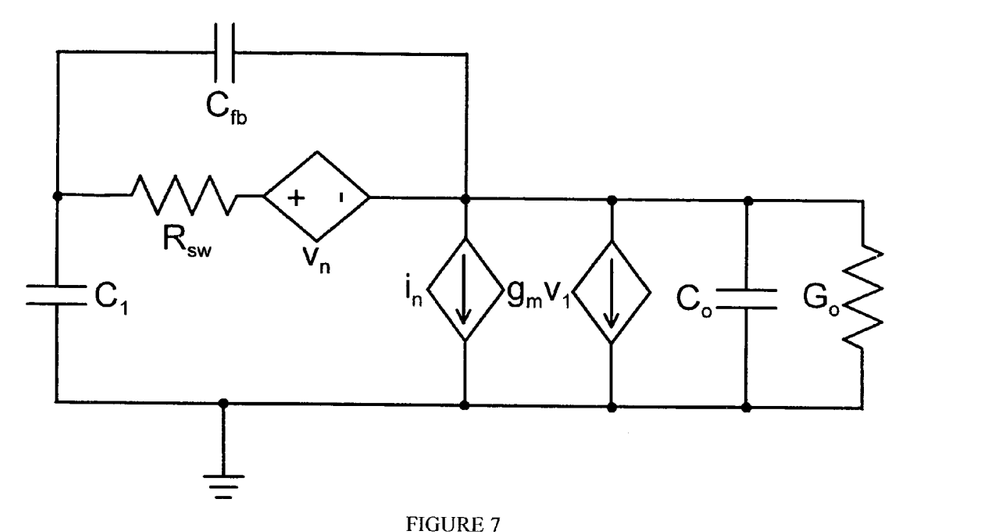
FIG. 7 is a small-signal equivalent circuit diagram illustrating the compact amplifier system for the CMOS imaging array of the present invention during feedback-enhanced reset.

In FIG. 7, which is the small-signal equivalent circuit for the composite reset amplifier, the photodiode node has voltage $V_1$ and capacitance $C_1$ to ground. The amplifier output node has voltage $V_2$, output capacitance $C_o$ and output conductance $G_o$ to ground. $C_o$ is the capacitance associated with the entire reset access bus, most of which comes from the M3–M4 junctions of each row. $g_m$ is the transconductance of MOSFET M1, possibly degenerated by MOSFET M4; it is shown as a controlled current source. The feedback capacitance, $C_{fb}$, is the parasitic Miller capacitance of MOSFET M1. Noise from MOSFET M1 is represented by current source $i_n$, and noise from MOSFET M3 (which is operated in the ohmic region) is represented by voltage source $v_n$. Not included in this simplified model is the noise from capacitive feed-through of the tapered-reset waveform.

Using the small-signal equivalent circuit, a simplified noise formula can be derived since:

$$i_n^2 = \frac{4}{3}(4kT)g_m;$$

$$v_n^2 = 4kTR_{sw}$$

Assuming that the amplifier's dc gain, $A_{dc}$, is much greater than 1, then the rms reset noise is:

$$Q_n \cong \sqrt{kT(C_{amp}+C_{sw})_1} + \sqrt{kTC_{jb}}$$

$$Q_n \cong \sqrt{\frac{kTC_1}{1+k_1+k_2}} + \sqrt{kTC_{jb}} \text{ where}$$

$$k_1 = \frac{R_{sw}G_oC_1}{C_o+C_1} \text{ and } k_2 = \frac{R_{sw}g_mC_{jb}}{C_o+C_1}$$

The tapered-clock waveform's time constant is thus appropriately selected so that the dimensionless quantity ($k_1+k_2$) is significantly >1. The reset noise is hence reduced to the much smaller quantity stemming from the transconductance amplifier's feedback capacitance. In the present invention, this feedback capacitance is the parasitic Miller capacitance of MOSFET M1.

The present invention has the following approximate design values: 1000×700 format, 7 μm×7 μm pixel, $g_m$=20 μmho; $G_o$=0.08 μmho, $A_{dc}$=300; $C_1$=15 fF; $C_o$=3.0 pF and $C_{jb}$=0.3 fF. The desired tapered-clock frequency of 25 kHz that is fully compatible with video rate operation hence requires $R_{sw}$=50 GΩ and an optimum tapered-clock time constant of 25 μs. This yields $k_1+k_2$=58 for the preferred embodiment, and an equivalent noise capacitance of 1.18 fF. Since the nominal detector capacitance is 15 fF and kTC noise is proportional to the square root of the relevant capacitance, the reset noise is suppressed from about 55 e- to only 14 e-.

$R_{sw}$ must be tailored to support any changes in line rate. Increasing the line rate hence requires lower switch resistance. Table 1 numerically illustrates the impact on reset noise as the tapered-clock time constant is appropriately shortened. At a time constant of 2.7 μsec, the read noise degrades to 55 e-.

TABLE 1

Impact on Reset Noise for Preferred Embodiment

| $R_{SW}$ (GΩ) | 50 | 20 | 10 | 5 | 2 | 1 | 0.5 | 0.1 |
|---|---|---|---|---|---|---|---|---|
| $k_1 + k_2$ | 58 | 23.2 | 11.6 | 5.8 | 2.32 | 1.16 | 0.58 | 0.12 |
| Reset Noise (e-) | 14 | 17 | 21 | 26 | 35 | 41 | 47 | 55 |
| τ (μsec) | 25 | 25 | 24 | 22 | 18 | 14 | 9.5 | 2.7 |

In the preferred embodiment, column bus 20 is monitored by a standard column buffer to read the video signal when it is available. The key requirements on the column buffer are similar to conventional designs having to handle voltage-mode signals and are familiar to those skilled in the art.

In the present invention the various clocks are generated on-chip using standard CMOS digital logic. This digital logic implementation thus enables "windowing," wherein a user can read out the imager in various formats simply by enabling the appropriate support logic to clock the appropriate sub-format. With windowing, the 1024×728 format of the candidate embodiment can be read out as one or more arbitrarily sized and positioned M×N arrays without having to read out the entire array. For example, a user might desire to change a computer-compatible "VGA" format (i.e., approximately 640×480) to either Common Interface Format (CIF; nominally 352×240) or Quarter Common Interface Format (QCIF; nominally 176×120) without having to read out all the pixels in the entire array. This feature simplifies support electronics to reduce cost and match the needs of the particular communication medium. As an example, a personal teleconference link to a remote user having only QCIF capability could be optimized to provide QCIF resolution and thus reduce bandwidth requirements throughout the teleconference link. As a further example, an imager configured in Common Interface Format (CIF) could provide full-CIF images while supplying windowed information for the portions of the image having the highest interest for signal processing and data compression. During teleconferencing the window around a person's mouth (for example) could be supplied more frequently than the entire CIF image. This scheme would reduce bandwidth requirements throughout the conference link.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. An active pixel sensor circuit comprising:
   a photodetector;
   a reset transistor connected between the photodetector and a first bus;
   a snapshot transistor having a node connected to the photodetector;
   a driver transistor connected to a row driver bus and the snapshot transistor;
   a row driver circuit connected to the row driver bus;
   an isolation transistor connected between the driver transistor and a column bus; and
   a column buffer connected to the column bus;
   wherein the transistors are MOSFETs and a tapered reset signal is applied to the reset transistor in order to reset the photodetector, and wherein during a reset operation, the row driver circuit grounds the driver transistor such that at least a portion of the column buffer acts as a current source for a feedback amplifier formed by the driver transistor, isolation transistor, and the column buffer.

2. The active pixel sensor circuit of claim 1, wherein a charge from the photodetector is transferred to a gate capacitance of the driver transistor via the snapshot transistor.

3. The active pixel sensor circuit of claim 2, wherein the reset transistor discharges any charge left on the photodetector along with any charge on the gate of the driver transistor during a reset operation.

4. The active pixel sensor circuit of claim 3, wherein the reset transistor is disabled during a signal integration mode and a snapshot image capture mode.

5. The active pixel sensor circuit of claim 4, wherein, after snapshot image capture, the reset transistor is enabled in order to drain any unwanted charge that is generated after the integration mode.

6. A CMOS imager array circuit comprising:
   a photodetector;

a reset MOSFET having a source connected to the photodetector, a gate connected to a reset input signal, and a drain connected to a first bus;

a snapshot MOSFET having a source connected to the photodetector and a gate connected to a snapshot signal;

a driver MOSFET having a drain connected to a row driver bus and a gate connected to a drain of the snapshot MOSFET;

a row driver circuit connected to the row driver bus;

an isolation MOSFET having a drain connected to a source of the driver MOSFET, a gate connected to an access signal, and a source connected to a column bus; and a column buffer connected to the column bus;

wherein a tapered reset signal is applied to the reset MOSFET in order to reset the photodetector, and wherein during a reset operation, the row driver circuit grounds the driver transistor such that at least a portion of the column buffer acts as a current source for a feedback amplifier formed by the driver transistor, isolation transistor, and the column buffer.

7. The CMOS imager array circuit of claim 6, wherein the row driver circuit and the column buffer are shared among a plurality of pixel circuits.

8. The imager array of claim 7, wherein the reset, snapshot, driver and isolation MOSFETs are all of the same polarity.

9. The CMOS imager array of claim 8, wherein a charge from the photodetector is transferred to a gate capacitance of the driver MOSFET via the snapshot MOSFET.

10. The CMOS imager array of claim 9, wherein the reset MOSFET discharges any charge left on the photodetector along with any charge on the gate of the driver MOSFET during a reset operation.

11. The CMOS imager array of claim 10, wherein the reset MOSFET is disabled during a signal integration mode and a snapshot image capture mode.

12. The CMOS imager array of claim 11, wherein, after snapshot image capture, the reset MOSFET is enabled in order to drain any unwanted charge that is generated after the integration mode.

* * * * *